United States Patent [19]

Neumann et al.

[11] Patent Number: 4,556,589
[45] Date of Patent: Dec. 3, 1985

[54] COMPOSITE MATERIAL OF PLASTICIZED POLYVINYL CHLORIDE COATED WITH ACRYLIC RESIN-FLUORINE-CONTAINING COPOLYMER TOP COAT

[75] Inventors: Wolfgang Neumann, Waldkraiburg; Hans-Jürgen Hendriock, Burghausen; Herbert Fitz, Burgkirchen, all of Fed. Rep. of Germany

[73] Assignee: Hoechst Aktiengesellschaft, Fed. Rep. of Germany

[21] Appl. No.: 704,388

[22] Filed: Feb. 22, 1985

[30] Foreign Application Priority Data

Feb. 22, 1984 [DE] Fed. Rep. of Germany ....... 3406278
Dec. 7, 1984 [DE] Fed. Rep. of Germany ....... 3444631

[51] Int. Cl.$^4$ ............................................. B32B 27/00
[52] U.S. Cl. ..................................... 428/35; 428/252; 428/253; 428/286; 428/287; 428/421; 428/422; 428/520; 428/522
[58] Field of Search .................. 428/35, 252, 253, 286, 428/287, 421, 422, 520, 522

[56] References Cited

U.S. PATENT DOCUMENTS 4,483,900 11/1984 Goldfarb ............................ 428/421

Primary Examiner—Marion E. McCamish
Attorney, Agent, or Firm—Connolly and Hutz

[57] ABSTRACT

Composite material composed of
(a) a plasticized PVC substrate, if appropriate a fabric coated with plasticized PVC, and
(b) a top layer composed of
  ($b^1$) 5 to 100% by weight of a mixture of an acrylic resin and plasticized PVC, and
  ($b^2$) 0 to 95% by weight of a fluorine-containing copolymer formed from vinylidene fluoride, hexafluoropropylene, tetrafluoroethylene and, if appropriate, a further fluoroolefin or fluoroalkyl vinyl ether, wherein, if the content of ($b^1$) in (b) is 0 to 15% by weight, a sealing layer composed of the fluorine-containing copolymer ($b^2$) is also applied to the top layer. The composite material is particularly suitable for structural units belonging to the field of textile construction.

10 Claims, No Drawings

COMPOSITE MATERIAL OF PLASTICIZED POLYVINYL CHLORIDE COATED WITH ACRYLIC RESIN-FLUORINE-CONTAINING COPOLYMER TOP COAT

The invention relates to a composite material composed of a plasticized PVC substrate which has been provided with a top layer and, if appropriate, a sealing layer.

Plasticized polyvinyl chloride is used to a large extent for surface coatings and impregnations, for example on fabrics or as an upholstery covering. It is known that, besides all their known advantages, plasticized PVC surfaces have the disadvatage of a somewhat tacky surface, which therefore attracts soot and dust to a considerable extent, so that this property considerably reduces the value in use of the articles thus coated, above all when they are used externally. Plasticized PVC surfaces are therefore often provided with a so-called top lacquer (finishing layer) composed of polyacrylate resins (cf., for example, Kunststoff-Handbuch ["Plastics Handbook"], volume II, part 1: polyvinyl chloride, Carl Hanser Verlag Munich, 1963, pages 427 to 428). In order to improve the adhesion, in most cases a certain proportion of the plasticized PVC or PVC paste is added. However, these PVC substrates which have been provided with a polyacrylate top layer are not completely satisfactory either. After this treatment they also tend to become soiled, even if to a slighter extent, and also have an inadequate resistance to chemicals and a stability towards weathering which is not sufficient for external use. The polyacrylate top layer must be kept relatively thin, since top layers of this kind become sensitive to fracture if the layer thickness is fairly large and produce fractures which are visible to the naked eye, and such a relatively thin layer is incapable of exerting an absolutely complete plasticizer barrier action.

There is, therefore, a need for a suitably coated plasticized PVC substrate which does not have the disadvantages mentioned.

The present invention satisfies this requirement by means of a composite material composed of:
(a) a substrate layer composed essentially of plasticized PVC, and
(b) a top layer, applied to one or both sides of this substrate layer and composed of:
(b$^1$) 5 to 100% by weight of a mixture of acrylic resins composed of 5 to 60% by weight of plasticized PVC or an internally plasticized copolymer of vinyl chloride and - to bring the total up to 100% by weight, - an acrylic resin, and
(b$^2$) 0 to 95% by weight of a fluorine-containing copolymer containing 50 to 20% by weight of copolymerized units of vinylidene fluoride, 10 to 30% by weight of copolymerized units of hexafluoropropylene and copolymerized units of tetrafluoroethylene, the proportion of the latter being at least 30% by weight in the copolymer, and copolymerized units of another fluoroolefin or fluoroalkyl vinyl ether in an amount of 0 to 5% by weight,
subject to the proviso that, if the content of the fluorine-containing copolymer (b$^2$) in the top layer is 0 to 15% by weight, there is also provided, on the latter, (c) a sealing layer which is solely composed of the fluorine-containing copolymer defined under (b$^2$).

The fluorine-containing copolymer employed within the scope of this composite material according to the invention as the component (b$^2$) of the top layer or as the sealing layer possesses a number of exceptional properties which make it suitable for use as a seal: it has a high resistance to weathering, oil and chemicals; it is absolutely resistant to moisture and prevents the migration of plasticizers through the sealing layer; it has an extremely low melting point or softening point, and, at fairly high contents of vinylidene fluoride (>30% by weight), it has a good solubility in organic solvents. The last-mentioned properties facilitate the application and formation of a coherent sealing film without damage to the underlying layers of the composite material. Finally, these fluorine-containing copolymers are strongly antiadhesive and dirt-repellent. However, whereas on their own they virtually do not adhere at all to PVC and can easily be removed again after application, they form, surprisingly, a firmly adhering bond together with the polyacrylate resin of the top layer or on the latter, and also do this if this polyacrylate resin is mixed with PVC.

The fluorine-containing copolymers employed in accordance with the invention as component (b$^2$) in the top layer and/or in the sealing layer are known per se. Their preparation is effected, as described, for example, in Belgian Pat. No. 844,965, by copolymerization, preferably in an aqueous suspension, in the presence of catalysts which form free-radicals, such as, for example, alkali metal or ammonium persulfates. Copolymers suitable for use as the sealing layer for the composite materials according to the invention are those containing 50 to 20% by weight of copolymerized units of vinylidene fluoride, 10 to 30% by weight of copolymerized units of hexafluoropropylene and (as the remainder up to 100% by weight) copolymerized units of tetrafluoroethylene, the latter being intended to amount to at least 30% by weight of the copolymer. The composition is preferably 45 to 30% by weight of copolymerized units of vinylidene fluoride, 15 to 25% by weight of copolymerized units of hexafluoropropylene and (the remainder up to 100% by weight) copolymerized units of tetrafluoroethylene, the latter being intended to amount to at least 30% by weight of the copolymer. The said copolymers can, if appropriate, also contain fairly small proportions of copolymerized units of at least one other fluoroolefin or fluoroalkyl vinyl ether, in particular perfluoropropyl vinyl ether. Copolymers of this type are known, for example, from U.S. Pat. No. 3,235,537 or European Laid-Open Specification 2,809. The amounts of these units should not exceed 5% by weight, preferably 3% by weight. Copolymers composed solely of copolymerized units of vinylidene fluoride, hexafluoropropylene and tetrafluoroethylene are preferred, however.

In addition to other advantageous properties, if their content of vinylidene fluoride is fairly high (>30% by weight), the copolymers thus described have a good solubility in customary organic solvents, such as, for example, methyl ethyl ketone, acetone, tetrahydrofuran, ethyl acetate or diisopropyl ketone, and also a very low—unusually low for fluorine-containing polymers—melting point or melting range, which varies within the range from 90° to 180° C., depending on the composition. It is therefore possible to achieve a continuous and uniform coating film, either by applying such a solution and subsequently evaporating the solvent under mild conditions or by applying an aqueous dispersion and subsequently warming to 160° to 180° C.

Substrates which can be used for the composite materials according to the invention are sheet-like structures composed of plasticized polyvinyl chloride, such as, for example, sheets, films, tapes and the like. Within the scope of this description, the term plasticized PVC is to be understood as meaning any type of PVC which has been plasticized by external plasticizers, including also the so-called polymeric plasticizers. It is also within the scope of this invention for the externally plasticized PVC to contain, in addition, minor proportions of copolymerized units of internally plasticizing comonomers, such as, for example, vinyl acetate, acrylate or methacrylate.

Preferred substrates are fabrics and also other textile sheet-like structures, such as knitted fabrics and nonwovens composed of natural fibers, such as cotton, semi-synthetic fibers, such as staple rayon or artificial silk, or fully synthetic fibers, such as polyamide, polyacrylic or, preferably, polyester fibers, which have been impregnated and/or coated with plasticized PVC. Coated fabrics of this type preferably have a weight per unit area of 200 to 1,200 g/m$^2$, but the amount used for coating can also be outside these limits. The plasticized PVC coating, in the form of a plastisol (composed of about 40 to 75, preferably 50 to 70, % by weight of PVC and about 25 to 60, preferably 30 to 50, % by weight of plasticizer), is usually applied to both sides of the textile sheet-like structure in at least two and not more than six layers, the first layer on both sides containing, if appropriate, an adhesion promoter. The said sheet-like structure can also be composed, completely or partially, of glass or other mineral fibers. It is also within the scope of this invention to convert the plasticized PVC completely or partially into a porous or cellular structure by adding suitable auxiliaries. It is also possible to mix customary additives, such as fillers and pigments, for example titanium dioxide, antimony(III) oxide or carbon black or stabilizers, flame-retarding agents and antistatic agents, into the plasticized PVC. However, substrates which have been prepared by bonding fabrics to plasticized PVC films or by coextruding plasticized PVC with textile structures, can also be employed for the composite material according to the invention. All the sheet-like structures described in this way are to be understood by the expression "substrate layer which is essentially composed of plasticized PVC".

A top layer composed of (b$^1$) 5 to 100% by weight of a mixture of acrylic resins and (if appropriate) (b$^2$) of 0 to 95% by weight of the fluorine-containing copolymer described above, is applied to the substrate layer on one side or, preferably, on both sides. The mixture of acrylic resins is composed of polyalkyl acrylates or polyalkyl methacrylates or mixtures thereof, this acrylic resin being mixed with 5 to 60% by weight, preferably 5 to 40% by weight, of plasticized PVC or, in particular, of an internally plasticized copolymer of vinyl chloride. The alkyl radicals in the said polyalkyl acrylates and polyalkyl methacrylates are preferably short-chain alkyl radicals having 1 to 4 carbon atoms. Special mention should be made of polymethyl methacrylate, particularly preferably as a mixture with polybutyl acrylate. Without pretreatment of the substrate, these acrylic resins adhere only with difficulty to the PVC of the substrate layer. In order to avoid involved pretreatment stages, it is therefore advantageous to add proportions of, preferably externally plasticized, PVC (as has been defined above) or of internally plasticized PVC. The latter is composed of copolymers of vinyl chloride with vinyl acetate, acrylates, methacrylates or maleates. Additionally, (b$^2$) 0 to 95% by weight - relative to the total weight of the mixture (b$^1$)+(b$^2$) for the top layer - of the fluorine-containing copolymer described above are incorporated into this mixture of acrylic resins.

It is preferable to mix in 70 to 95% by weight, especially 80 to 90% by weight—relative to the total weight of the mixture for the top layer - of the fluorine-containing copolymer of the component (b$^2$), the proportion of the mixture of (b$^1$) of acrylic resins then being 5 to 30, and especially 10 to 20, % by weight. If the fluorine-containing copolymer (b$^2$) is present in the top layer only in small proportions, $\leq$15% by weight, or not at all, it is necessary additionally to provide, on this top layer, an external sealing layer composed solely of the fluorine-containing copolymer defined under (b$^2$). The mixtures described for the top layer - either with or without fluorine-containing copolymer - are applied from organic solvents, such as methyl isobutyl ketone, methyl ethyl ketone, dimethylformamide, cyclohexanone, ethyl acetate or tetrahydrofuran or other such solvents or mixtures of such or similar solvents. The amount should be about 2 to 100 g/m$^2$, preferably 2 to 20 g/m$^2$, and, if appropriate, a delustering agent is added to top layers of this type. Customary pigments, fillers or antistatic agents, such as, for example, titanium dioxide, antimony(III) oxide or carbon black, can be mixed into the top layer before application.

If appropriate, the fluorine-containing copolymer described above is applied, also from a solution in an organic solvent or else, however, from an aqueous dispersion, to the sheet-like structures which have been built up in this manner. The application of the top layer and, if appropriate, of this sealing layer, is effected by customary methods, for example by spraying, by roll-coating by means of a fine screen-lined roller, by application with a doctor blade or by similar methods. The thickness of the sealing layer is not critical. Even 2 g/m$^2$ can be adequate for the sealing effect desired. Depending on the end use, the layer applied can have a weight per unit area of up to 20 g/m$^2$, preferably up to 10 g/m$^2$. Customary pigments, fillers or antistatic agents, such as, for example, titanium dioxide, antimony(III) oxide or carbon black, can be mixed into the sealing layer before application.

After the application of the top layer or the sealing layer, the organic solvent or the water is first removed by heating, and heating is then continued up to about 150° to 180° C., in the course of which a continuous and crack-free coating film is formed. If application is made from an organic solvent, even heating to fairly low temperatures can also be sufficient for the formation of the film.

If the content of the fluorine-containing copolymer (b$^2$) in the top layer is more than 15% by weight, and in particular more than 70% by weight, the desired plasticizer barrier action, together with the other advantageous properties, is also achieved in accordance with the invention if no sealing layer is provided.

The composite materials, according to the invention, defined in this way possess an excellent dirt-repellency and stability to the effects of weathering, oil and chemicals, and also to UV light. By virtue of this property, they are suitable for a variety of applications, above all in the outdoor field and the field of so-called textile construction. The following may be mentioned as examples of use of the composite materials according to the invention: air-inflated structures, roofing webs, stressed structures, partitions, silos and the like. The following can also be manufactured therefrom: tents, swimming pool linings, tarpaulins, for example for trucks, container covers and conveyor belts and band conveyors.

The invention is illustrated by means of the following examples:

Preparation of the PVC substrate provided with a top layer (A) The greige fabric employed is a polyester fabric composed of Trevira ® high-strength polyester yarn having the following characteristic data:

| Denier (warp/weft) | 1,100/1,100 dtex |
| Ends/picks | 9/9 per cm |
| Weave | calico-1/1 |
| Thickness | 310 μm |
| Weight per unit area | 205 g/m². |

The greige fabric is coated with PVC plastisol containing 8% by weight of titanium dioxide as a white pigment. After careful drying, the coating contains 41% by weight of plasticizer. The weight per unit area is 750 to 800 g/m².

(B) A top layer composed of polymethyl methacrylate and plasticized PVC (plasticizer content 41% by weight) is applied to both sides of this substrate in a ratio of 60:40 parts by weight. The weight per unit area of the top layer is about 8 g/m².

Preparation of the composite materials according to the invention

EXAMPLE 1

A fluorine-containing copolymer of the following composition: 30% by weight of copolymerized vinylidene fluoride units, 15% by weight of copolymerized hexafluoropropylene units and 55% by weight of copolymerized tetrafluoroethylene units (melting point 154° C.) is applied from a 50% strength by weight aqueous dispersion by means of the air spraying process to one side of the abovementioned PVC substrate which has been provided with the top layer.

A continuous sealing film is then formed by heating at 180° C. for 15 minutes. The sealing layer applied amounts to 17 g/m².

EXAMPLE 2

A fluorine-containing copolymer having the following composition: 40% by weight of copolymerized vinylidene fluoride units, 20% by weight of copolymerized hexafluoropropylene units and 40% by weight of copolymerized tetrafluoroethylene units is applied from an aqueous dispersion (50% by weight) by the procedure of Example 1 to the abovementoned PVC substrate which has been provided with a top layer, and the coating is then heated and kept at a temperature of 160° C. for 15 minutes. Amount applied: 15 g/m².

EXAMPLE 3

The fluorine-containing copolymer described in Example 2 is applied by the same process to the same substrate, but in this case from a 5% strength by weight solution in methyl ethyl ketone, and is then first dried for 15 minutes at 70° C. and then for 15 minutes at 170° C. and is baked. Amount applied: 14 g/m².

EXAMPLE 4

A top layer mixture is applied to one side of the PVC-coated polyester fabric (A) by means of a doctor knife. This mixture is obtained by adding 15 parts by weight of the acrylic resin mixture described under (B), composed of polymethyl methacrylate and plasticized PVC in a ratio of 60:40 parts by weight, to 85 parts by weight (as a 20% strength by weight solution in methyl ethyl ketone) of the fluorine-containing copolymer described in Example 2.

The laminate thus obtained is first dried for 10 minutes at 70° C. and is then baked for a further 10 minutes at 160° C. The amount applied is 18 g/m².

EXAMPLE 5

A top layer mixture is applied to one side of the PVC-coated polyester fabric (A) by means of a doctor knie. This mixture is obtained by adding 90 parts by weight of the acrylic resin mixture described under (B), composed of polymethyl methacrylate and plasticized PVC in a ratio of 60:40 parts by weight, to 10 parts by weight (as a 20% strength by weight solution in methyl ethyl ketone) of the fluorine-containing copolymer described in Example 2. The top layer thus obtained is dried for 10 minutes at 100° C. The amount applied is 5 g/m².

A sealing layer composed solely of the fluorine-containing copolymer described in Example 2, but in this case as a 20% strength by weight solution in methyl ethyl ketone, is also applied by means of the doctor knife to this layer. The laminate is first dried for 10 minutes at 70° C. and is then baked for 10 minutes at 160° C. The amount of sealing layer applied is 15 g/m².

Comparison tests

PVC substrates, prepared in accordance with instructions (A) and composed either only of the acrylic resin mixture (b¹) (60:40 polymethyl methacrylate and plasticized PVC), or of the mixture, indicated in Example 4, of an acrylic resin mixture of this type with the fluorine-containing copolymer (b¹) plus (b²), are coated as described in the instruction under (B) and in Example 4. For comparison, the same PVC substrate is coated solely with the fluorine-containing copolymer of Example 2 as a 20% strength by weight solution in methyl ethyl ketone. The sealing layer can be removed in one strip from this comparison sample inn the fingernail test, whereas, with the composite materials according to the invention, although damage can be caused to the sealing layer or the top layer, their removal cannot be achieved even by repeated scratching.

We claim:
1. A composite material which comprises
 (a) a substrate layer composed essentially of plasticized polyvinyl chloride, and
 (b) a top layer, applied to one or both sides of this substrate layer and composed of:
  (b¹) 5 to 100% by weight of a mixture of acrylic resins composed of 5 to 60% by weight of plasticized polyvinyl chloride or an internally plasticized copolymer of vinyl chloride and—to bring the total up to 100% by weight, —an acrylic resin, and
  (b²) 0 to 95% by weight of a fluorine-containing copolymer containing 50 to 20% by weight of copolymerized units of vinylidene fluoride, 10 to 30% by weight of copolymerized units of hexafluoropropylene and copolymerized units of tet- rafluoroethylene, the proportion of the latter being at least 30% by weight in the copolymer, and copolymerized units of another fluoroolefin or fluoroalky vinyl ether in an amount of 0 to 5% by weight, subject to the proviso that, if the content of the fluorine-containing copolymer ($b^2$) in the top layer is 0 to 15% by weight, there is also provided, on the latter, (c) a sealing layer which is solely composed of the fluorine-containing copolymer defined under ($b^2$).

2. A composite material as claimed in claim 1, wherein the substrate layer (a) is a woven or knitted fabric or nonwoven composed of textile materials which has been coated with plasticized polyvinyl chloride.

3. A composite material as claimed in claim 1, wherein the substrate layer (a) is a polyester fabric which has been coated with plasticized polyvinyl chloride.

4. A composite material as claimed in claim 1, wherein the acrylic resin of the top layer is polymethyl methacrylate.

5. A composite material as claimed in claim 1, wherein the acrylic resin of the top layer is a mixture of polymethyl methacrylate and polybutyl acrylate.

6. A composite material as claimed in claim 1, wherein the acrylic resin of the top layer is mixed with an internally plasticized copolymer of vinyl chloride containing at least one monomer from the group comprising vinyl acetate, acrylic acid esters, methacrylic acid esters, maleic acid esters of fumaric acid esters.

7. A composite material as claimed in claim 1, wherein the top layer is composed of 5 to 30% by weight of the acrylic resin mixture ($b^1$) and 70 to 95% by weight of the fluorine-containing copolymer ($b^2$).

8. A composite material as claimed in claim 1, wherein the fluorine-containing copolymer of the sealing layer contains 45 to 30% by weight of copolymerized units of vinylidene fluoride, 15 to 25% by weight of copolymerized units of hexafluoropropylene and at least 30% by weight of copolymerized units of tetrafluoroethylene as well as copolymerized units of another fluoroolefin or fluoroalkyl vinyl ether in an amount of 0 to 5% by weight.

9. The composite material as claimed in claim 1 in the form of a roofing web.

10. The composite material as claimed in claim 1 in the form of an air-inflated structure.

* * * * *